Aug. 4, 1959 J. E. VISTAIN, JR 2,898,114

PIVOTED POST CHANGER

Filed Jan. 11, 1951 2 Sheets-Sheet 1

INVENTOR.
James E. Vistain Jr.
BY
J. D. Douglas
His atty

Aug. 4, 1959 J. E. VISTAIN, JR 2,898,114

PIVOTED POST CHANGER

Filed Jan. 11, 1951 2 Sheets-Sheet 2

INVENTOR.
James E. Vistain Jr.
BY
J. W. Douglas
His Atty.

2,898,114

PIVOTED POST CHANGER

James E. Vistain, Jr., Chicago, Ill., assignor to Admiral Corporation, Chicago, Ill.

Application January 11, 1951, Serial No. 205,458

11 Claims. (Cl. 274—10)

This invention relates to improvements in automatic record players of the class wherein a spindle having a shoulder thereon is adapted to provide support, above the level of a driven turntable, for a stack of records at their center holes while the stack is concurrently supported at its peripheral regions by a ledge or bracket which is movable to accommodate stacks differing in diameter. More especially the invention relates to the mechanism which is employed for removing the bottom record of the stack from the remaining records thereof and dropping it to the turntable for reproduction.

In a structure of the foregoing description, mechanism to release a record from a stack of records, supported above the level of the turntable, usually included a fixed spindle, at the axis of a turntable, having a shoulder from the support of which the bottom record of the stack was released by its displacement laterally of the spindle by an ejector mechanism normally affording support for the stack of records at its periphery. This construction involved linkages which were intricate and which consequently added unnecessarily to the cost of manufacture.

By the present invention, I am able to remove the bottom record from a stack by mechanism which is less intricate of construction and which consequently enables a manufacturer to produce a record player at a lower cost and which satisfactorily performs the function of releasing a bottom record of a stack to the turntable.

In order that the foregoing function may be carried out, I pivot the spindle so that it is adapted to swing about an axis at approximately the upper surface of the turntable and oscillate the entire stack of records over a simple bracket which supports the edges of the records and on which an abutment member is carried. This member interferes with the oscillatory motion of the bottom record of the stack sufficiently to cause its displacement from the support of the shoulder of the spindle so that the bottom record may slide down said spindle to the turntable.

Other advantages of the invention will be set forth in part hereinafter and in part will be obvious herefrom, or may be learned by practice with the invention, the same being realized and attained by means of the instrumentalities and combinations pointed out in the appended claims.

Figures 1, 5, 6:
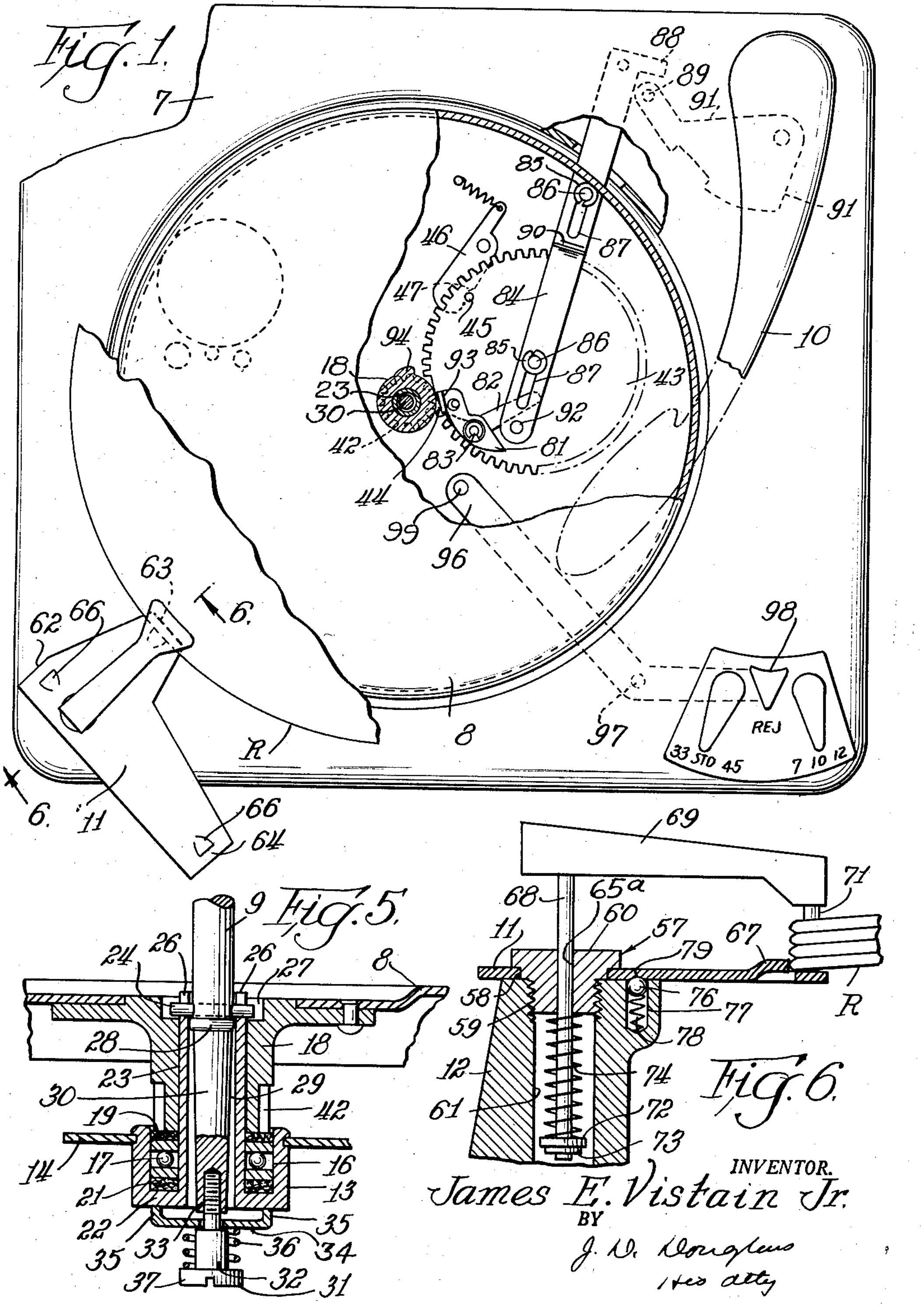
Fig. 1 is a top plan view of a record player in which the novel features are incorporated, parts being broken away to reveal the structure of other parts.
Fig. 5 is a vertical sectional view on line 5—5 of Fig. 3.
Fig. 6 is a vertical sectional view taken on line 6—6 of Fig. 1.
Figures 2, 3, 4:
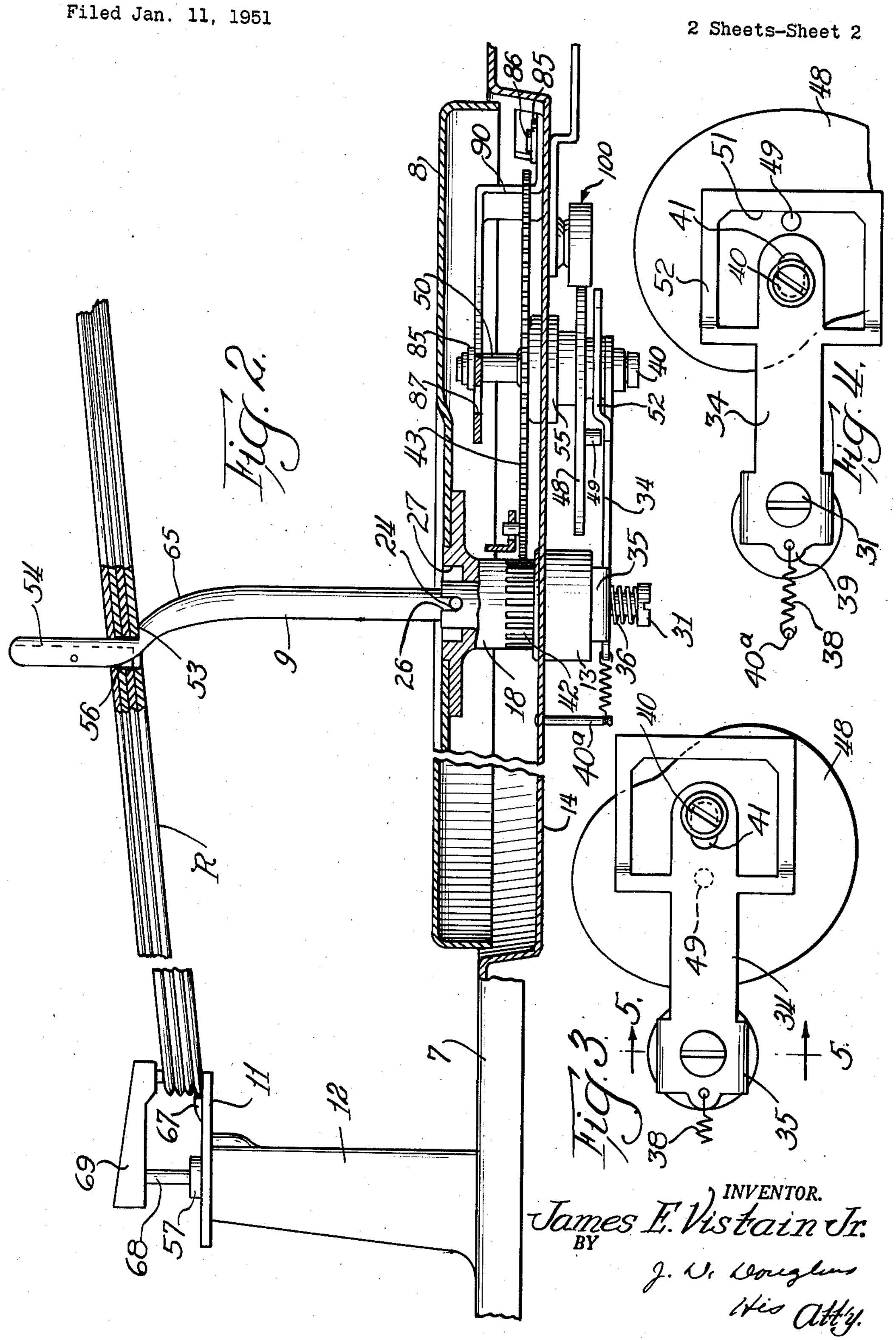
Fig. 2 is a side elevational view of the same, parts being broken away to reveal the structure of other parts.
Fig. 3 is a bottom plan view of mechanism for operating the spindle.
Fig. 4 is a view similar to Fig. 3, some of the parts being in a different position.

In Figs. 1 and 2 the reference character 7 is used to denote a base plate for the novel record player which also includes a turntable 8, spindle 9 and pickup arm 10. Magazine support for a stack of records R above the turntable is provided by the spindle 9 and a bracket plate or ledge 11 supported from the base plate 7 by a column 12.

Support for the turntable 8 comprises a bearing support member 13 which is rigidly attached in any suitable manner to a depressed or offset wall portion 14 of the base plate 7. Support member 13 has an annular recess 16 (Fig. 5) about the vertical axis thereof, in which is accommodated a ball bearing 17 from which a hub portion 18, of the turntable, is separated by one washer 19 of insulation material, while a second washer 21 of the same material separates the bearing from a bottom wall 22 of the support member. The turntable is journalled on a hollow pintle 23 which extends vertically upward from the bottom wall 22.

At a point slightly below the level of the top of turntable 8, the spindle 9 carries a pin 24 passing transversely thereof. The pintle 23 extends upward nearly to the plane of the record support surface of turntable 8, and is slotted at its upper end by a pair of diametrically opposite notches 26 in which the pin 24 is received. The notches thus affording bearings for the pin. Adjacent pin 24, the turntable is recessed at 27, both to provide clearance for the pin and in order that the same may perform the function of anchoring the turntable against removal from the pintle 23. This, of course, is predicated on anchorage, later to be described, for the spindle. Below and in close proximity to pin 24, the spindle 9 carries an annular boss 28 for intimate relationship to the walls of a bore 29 of the pintle so that therein, the spindle is retained against displacement laterally thereof over the axis of pin 24. Nevertheless, the spindle is adapted to have freedom for rocking about the axis of pin 24. And for this purpose, a shank portion 30, of the spindle within bore 29, is tapered from the annular boss 28 to the lower extremity of said bore.

In order to retain spindle 9 in position wherein the pin 24 is in cooperative association with the notches 26, an anchor screw 31 is provided. It includes a body portion 32 from which a threaded portion 33, of reduced diameter, is in extension which passes freely through a link member 34, later to be described, and is threaded into the lower end of shank 30. Link 34 bears, on either side thereof, an upturned ear 35 adapted to have bearing engagement with the lower side of wall surface 22. And this is maintained by force of a compression spring 36 coiled about the body portion 32 between link 34 and a head 37 on the screw 31.

The spindle 9 is retained in a predetermined normal position with respect to the bracket plate 11 while a record is played. The means by which the spindle is adapted to be so maintained is indicated in Figs. 2 and 3 wherein a tension spring 38 is shown anchored between an ear 39, on the link 34, and some laterally immovable support such as a screw 40*a*, carried by the base plate 14. One of the ends of link 34 is anchored slidably by a screw 40 passing freely through a slot 41 in the link.

The spindle 9 is swung about pin 24 through the agency of cyclically operating mechanism normally disengaged from the turntable; that is, during reproduction of a record, but adapted to be drivingly coupled to the turntable in response to actuation of trip mechanism to be referred to at greater length hereinafter. A suitable form of cyclically operating mechanism may include; the hub 18, having a series of teeth to provide a pinion 42, while rotatably supported from the base plate 14 is a mutilated gear 43, the continuity of whose teeth is interrupted by a blank space 44, normally beside the pinion 42. The space 44 is releasably retained in its normal position by engagement of a pin 45, on the lower side of gear 43, with the spring-pressed arm 46, the pin engaging a notch 47 on the side of said arm. The gear 43 is drivingly coupled by a shaft 50, journalled in a bearing member 55 on the plate 14, to a master cam 48 carrying a pin 49 thereon. When the gear 43 is moved into mesh with pinion 42, by means later to be referred to, the pin 49 is carried through an orbit from a point over the link 34 to a cam surface 51 at the edges of an upwardly-offset portion 52, of the link 34, which is thereby slid on the screw 40 from one of its extreme positions shown in Fig. 3 to another of its extreme positions shown in Fig. 4, against the resistance of spring 38. The latter position is reached by pin 49 when gear 43 has turned through approximately a half turn. Further motion of pin 49 from its Fig. 4 position enables spring 38 to return the link in the opposite direction until the pin reaches a stationary point again as shown in Fig. 3. Concurrently with pin 49 reaching its Fig. 3 position, the blank space 44 is returned to adjacent relationship to the pinion 42. These operations are accompanied by a forward and backward motion of the spindle 9 because of the coupling of the link 34 thereon.

The upper part of spindle 9 is provided with a shoulder 53, pilot portion 54 and vertically slidable gate member 56 in accordance with the teachings of the patent to Willard Faulkner, No. 2,498,333.

Provision is made for supporting 7-inch, 10-inch and 12-inch diameter records in groups of common size on the shoulder 53, and concurrently, on the bracket plate 11. In order that this may be carried into effect, plate 11 is pivoted to the column 12. This is accomplished by a screw 57 which has a shank or journal portion 58, of length slightly greater than the thickness of the bracket 11 on which said bracket is adapted to turn. Also from the portion 58 a section 59, of reduced diameter, extends downward and is threaded in a bore 61 within the column 12. The bracket plate 11 is thus confined by a head 60, of the screw, and column 12 so that said plate is adapted to be manually swung about the screw 57. By such an operation, one of three ledges 62, 63 or 64 may be moved to a position on a line between screw 57 and the center of the turntable 8. Of the three ledges shown, ledge 64 is adapted to be moved nearest to the spindle for support of a stack of 7-inch records. The ledge 63 is adapted to afford support for 10-inch records when moved nearest the spindle, while 12-inch records may be supported by ledge 62 when it is moved to a position nearest the spindle. The plate 11 is held releasably in any of its three positions by a detent mechanism comprising a ball 76 urged upward by a spring 78. This device is disposed in a hole 77 in the pedestal 12. The ball is urged into dimples 79 in the plate 11 located so as to position the plate properly for the chosen size of record.

Each of the mobile record support surfaces 62, 63 and 64 is provided with an abutment surface 66 which is adapted to be intimately associated with the periphery of a record of the particular size corresponding to the support surface. Although an abutment surface 66 may be provided by any suitable protuberance projecting a distance upward from plate 11 less than the thickness of a record, a desirable abutment surface may be provided by deforming a portion of said plate upward, as at 67 (Fig. 6).

It will now be apparent that when the spindle 9 is rocked counterclockwise (Fig. 2) about the axis of pin 27, the shoulder 53 is carried toward whichever of the abutment surfaces 66 is nearest said spindle. In this operation, all the records, supported by shoulder 53, are moved toward the screw 57, with the exception of the bottom record. Its movement being precluded by the adjacent abutment surface 66, the bottom record is displaced edgewise, with the respect to the spindle, until its center hole is over the shoulder 53. At this point, since the shoulder 53 affords no support for the bottom record, it drops to the support of the turntable, sliding down the rounded part 65 of the spindle and off the edge of the plate 11. During the forward movement of the spindle, the gate member 56 precludes edgewise movement of those records above the bottom record, with respect to said spindle. As the spindle reaches the limit of its backward movement, the remaining bottom record drops to the support of the ledge in front of the abutment member wherein it remains until motion of the spindle is repeated. The lowest record of a stack is thus dropped with each cycle of operation of the spindle until all of the group has accumulated in superimposed relationship to each other on the turntable.

In the operation just indicated, the mechanism thus far described is adequate to manipulate 7-inch diameter records. In the case of 10-inch and 12-inch diameter records, however, additional means is advisable or necessary to urge the records against the bracket plate 11, since records of the 10-inch and 12-inch size are apt to be heavy at one side and consequently liable to tip about the spindle shoulder 53 to such an extent that when a group of the same are carried with the spindle the bottom record may fail to be engaged by one of the abutment surfaces 66.

Accordingly, the provision made to urge the 10-inch and/or 12-inch diameter records into engagement with plate 11 includes hold-down means which comprises a rod 68 which is supported for longitudinal movement thereof within a bore 65 axially of the screw 57. At the upper end thereof and in extension laterally from rod 68 is an arm 69, which bears on the lower side of its free end at least one finger member 71 of some resilient material such as rubber for engagement with the top of the uppermost record in the stack. The lower end of rod 68 carries a washer 72 which is retained on said rod by a C-washer 73. The fingers 71 are biased toward the plane of bracket plate 11 by a compression spring 74, coiled about rod 68, between the screw 57 and washer 72.

The spindle, as previously described, is adapted to be rocked about pin 27 by cyclical operation of the gear is described, in detail, in my copending application filed May 11, 1950, Ser. No. 161,370, now Patent No. 2,795,429, issued June 11, 1957. Consequently, the trip mechanism will be described but briefly. It comprises a pair of dogs 81 and 82 which are frictionally associated with each other and pivoted at 83 to the mutilated gear 43. The dogs 81 and 82 are adapted to cooperate with a slider member 84 slidably disposed on the base plate. The slider 84 is held in place near its center by a pin 86 on the base plate, extending through a slot 87 in the slider and having a C-washer 85 above the slider. Adjacent the gear, the slider is offset at 90 and extends over the axle 50 which is shouldered and provided with a C-washer 85 to embrace the edges of a slot 87 near the outer end. The slider 84 is adapted to be moved outward by cooperation of an arm 88 thereon with a pin 89 on a crank arm 91 as the pickup is carried inwardly on tracking a record, means not shown, also being provided by which the crank arm 91 is adapted to swing with the pickup arm 10. As the slider 84 is moved outwardly and a pin 92 thereon carried into engagement with the dog 82, both of the dogs are turned about their pivot 83. In this operation, a lug 93 on the dog 81 is carried into engagement with a striker or projection 94, on the turntable hub 18. At first, and for approximately the remainder of the record tracking operation striker 94 merely continues to move dog 81 out of its arc. As the pickup arm enters the trip groove of a record it is tracking, however, the motion of dog 81 is fast enough for the lug 93 to be carried a distance toward the axis of the turntable sufficiently for driving engagement with striker 94 to be established. This engagement of members 93 and 94 imparts incremental turning motion to gear 92 which, although slight, is adequate to provide meshing engagement between the gear 43 and pinion 42. Thereupon the gear is turned through one revolution by the pinion until the blank space 44 is again beside the pinion and driving relationship between said pinion and gear is interrupted.

For manually initiating operation of the gear 43, a lever 96 is pivoted at 97 to the frame 7. At one end thereof, lever 96 bears a handle 98 by which it is adapted to be swung about its pivot 97 to carry a pin 99, on its other end, into engagement with dog 81 so that at any time said dog may be swung into the orbit of striker 94 and a record changing cycle manually initiated.

Means 100, for mainipulation of the pickup arm, may be of any preferred type, although it is conceived that the means should be operated by the cam 48. Since many such manipulating means are known in the art, none has been disclosed nor described here. However, one possible type is shown and described in my aforementioned co-pending application, Ser. No. 161,370, filed May 11, 1950.

Although I have described one embodiment of the invention, I am aware that other and extensive departures may be made from the one disclosed without departing from the spirit or scope of the invention.

I claim:

1. In a record player comprising a turntable rotatably mounted on a bearing, said bearing having a bore therein, and magazine means adapted to support a stack of records above the level of the turntable comprising a spindle having a shoulder on which a stack of records is adapted to rest at their center holes while being concurrently supported at their peripheral edges by a bracket member; means to release the bottom record of the stack to the turntable including abutment means on the bracket adapted to be engaged by the periphery of only the bottom record of the stack, a conical base on the spindle, pivotal means in connection with the upper end of the bearing and the spindle by which the spindle is adapted to be pivotally supported, said conical base extending into said bore, the shoulder of said spindle being thereby adapted to be moved toward and away from the abutment means, and operating means coupled to the conical base by which said spindle is adapted to be swung about the pivotal means sufficiently for the bottommost record of the stack to be displaced from the support of the shoulder by said abutment means.

2. In a record player comprising a turntable above the level of which records in stacks differing in diameter and the records of each stack of common diameter are adapted to be supported by magazine means comprising a spindle having a shoulder on which the records are adapted to rest at their center holes while concurrently supported at their peripheral edges by a bracket member; means to release the bottom record of the stack to the turntable including a plurality of separate abutment members on the bracket, each of the abutment members being for engagement by the periphery of a different size of bottom record of a stack resting on the bracket, coupling means in connection with the bracket by which said bracket is adapted to be adjustable for selectively carrying any one of the abutment members into a position for engagement by said bottom record, pivotal means in connection with the spindle by which said spindle is adapted to be swingably supported at the turntable, and operating means coupled to the spindle by which said spindle is adapted to be swung about the pivotal means to move the stack toward the bracket member sufficiently for the bottommost record of any size of stack to be displaced by engagement with said abutment means and from the support of the shoulder.

3. In a record player comprising a turntable above the level of which records in stacks differing in diameter and the records of each stack of common diameter are adapted to be supported by magazine means comprising a spindle having a shoulder on which the records are adapted to rest at their center holes while concurrently supported at their peripheral edges by a bracket member; means to release the bottom record of the stack to the turntable including a plurality of separate abutment members on the bracket, each of the abutment members being for engagement by the periphery of a different size of bottom record of a stack resting on the bracket, a first pivotal support means for the bracket by which said bracket is adapted to be adjusted for selectively positioning one of the abutment members in a position for engagement by said bottom record, second pivotal means in connection with the spindle by which said spindle is adapted to be swingably supported at the turntable, and operating means engaging the spindle by which the spindle is adapted to be swung about the pivotal means to move the stack toward the bracket member sufficiently for the bottomost record of any size of stack to be displaced by engagement with said abutment means and from the support of the shoulder.

4. In a record player comprising a turntable above the level of which records in stacks differing in diameter and the records of each stack of common diameter are adapted to be supported by magazine means comprising a spindle having a shoulder on which the records are adapted to rest at their center holes while concurrently supported at their peripheral edges by a bracket member; means to release the bottom record of the stack to the turntable including a plurality of separate abutment members on the bracket, each of the abutment members being for engagement by the periphery of a different size of bottom record of a stack resting on the bracket, first pivotal support means for the bracket by which said bracket is adapted to be swung for selectively positioning one of the abutment members in a position for engagement by said bottom record, detent means on the bracket by which said bracket is adapted to be releasably retained in any of the positions in which it is stationed, second pivotal means in connection with the spindle by which said spindle is adapted to be swingably supported at the turntable, and operating means coupled to the spindle by which said spindle is adapted to be swung about the pivotal means to move the stack toward the bracket member sufficiently for the bottommost record of any size of stack to be displaced by engagement with said abutment means and from the support of the shoulder.

5. In a record player comprising a turntable above the level of which a stack or records is adapted to be supported by magazine means comprising a spindle having a shoulder on which a stack of records is adapted to rest at their center holes while concurrently supported at their peripheral edges by a bracket member; means to release the bottom record of the stack to the turntable including abutment means on the bracket adapted to be engaged by the periphery of only the bottom record of the stack, pivot means in connection with the spindle by which said spindle is adapted to be tilted with respect to the abutment means, hold-down means in connection with said bracket to resiliently engage the top of the stack of records to at all times retain the bottom record thereof in operative association with said abutment means, and operating means coupled to the spindle by which said spindle is adapted to be moved sufficiently toward the abutment means for the bottom-most record of the stack to be displaced from the support of the shoulder by said abutment means.

6. In a record player comprising a pickup arm to track records, and a turntable adapted to turn about a hollow bearing member having centrally thereof a bore; magazine supports for unplayed records above said turntable comprising a spindle having a shoulder thereon and bracket means beside the turntable, pintle means on the spindle, seats on the bearing member for the pintle means, said seats being adjacent the top of the turntable, annular means on the spindle at the pintle means to cooperate with the bore for confining the spindle centrally of said bore, an extension portion of the spindle extending in said bore away from the annular means, resilient means coupled to the extension portion to maintain cooperation between the seats and pintle means thereby providing a horizontal axis about which the spindle is adapted to be rocked, and an abutment surface in connection with the bracket means, said abutment surface being adapted to resist movement of the bottom record over the bracket means when said spindle is swung about its axis toward the abutment thereby holding said record against movement and displacing said bottom record from the support of said shoulder.

7. In a record player comprising a pickup arm to track records and a turntable adapted to turn about hollow bearing means having centrally thereof a bore of uniform diameter; magazine support for unplayed records above said turntable comprising a spindle having a shoulder thereon and bracket means beside the turntable, a pivot connecting the spindle to the bearing means, an annular portion on the spindle at the pivot to cooperate with the bore thereby confining said spindle to a position centrally of said bore, a tapered shank extending from said annular portion to provide for swinging movement of said shank within the bore about said pivot, and an abutment surface in connection with the bracket means, said abutment surface being adapted to resist movement of a record resting on the shoulder of the spindle when said spindle is swung for displacement of the record from said shoulder.

8. An automatic phonograph apparatus comprising a turntable, a spindle projecting from the center of said turntable and having a shoulder adapted to support phonograph records adjacent the central opening thereof, said spindle also having a portion extending above said shoulder for passing through the central opening of a stack of records, a shelf mounted to the side of the turntable and having a portion adapted to support phonograph records adjacent the marginal edge thereof, a support located substantially in the plane of the turntable and mounting said spindle for tilting movement substantially radially of said turntable, a connection engaging said spindle and holding it in a predetermined position with respect to said shelf, means including said connection for tilting said spindle on said support and toward said shelf thereby slidably displacing the supported records over said portion of said shelf, and a stop fixed on said shelf to engage the supported lowermost record and restrain it against said displacement so that said spindle, in tilting toward said shelf, brings said shoulder into registration with the central opening of said lowermost record.

9. An automatic phonograph apparatus as set forth in claim 8 in which the mentioned shelf is mounted for rotatable adjustment about an axis substantially paralleling the plane of said spindle and includes a plurality of radially extended record-edge engaging portions adapted, upon said adjustment of said shelf, to be selectively placed to confront said spindle, each of said portions, when so placed, lying at a predetermined distance from said spindle to accommodate records of a certain diameter.

10. An automatic phonograph apparatus comprising a turntable, a spindle projecting from the center of said turntable and having a shoulder adapted to support phonograph records adjacent the central opening thereof, said spindle also having a portion extending above said shoulder for passing through the central opening of a stack of records, a shelf mounted to the side of the turntable and having a portion adapted to support phonograph records adjacent the marginal edge thereof, a support located substantially in the plane of the turntable and mounting said spindle for tilting movement substantially radially of said turntable, a lever arm engaging said spindle and holding it in a predetermined position with respect to said shelf, a cycling cam in engagement with said arm and operable to move the latter for first tilting said spindle on said support and toward said shelf and then returnng said spindle to said position thereby slidably displacing the supported records over said portion of said shelf, and a stop fixed on said shelf to engage the supported lowermost record and restrain it against said displacement in response to said tilting of said spindle so that said spindle, in tilting toward said shelf, brings said shoulder into registration with the central opening of said lowermost record thereby allowing the latter to drop below said shoulder so that said spindle, in returning to said position, withdraws said lowermost record from said shelf.

11. An automatic phonograph apparatus comprising a turntable, a hollow axle on which said turntable is rotatably mounted and having an end portion terminating substantially in the plane of said turntable, a spindle extending through said axle and projecting above said turntable, said spindle having a portion engaging said end portion of said axle for tilting movement substantially radially of said turntable, a shoulder on said spindle adapted to support phonograph records adjacent the central opening thereof, said spindle also having a portion extending above said shoulder for passing through the central opening of a stack of records, a shelf mounted to the side of said turntable and having a portion adapted to support phonograph records adjacent the marginal edge thereof, a connection engaging said spindle and holding it in a predetermined position with respect to said shelf, means including said connection for tilting said spindle on said end portion of said axle toward said shelf thereby slidably displacing the supported records over said portion of said shelf, and a stop fixed on said shelf to engage the supported lowermost record and restrain it against said displacement so that said spindle, in tilting toward said shelf, is brought into registration with the central opening of said lowermost record.

References Cited in the file of this patent

UNITED STATES PATENTS

| | | |
|---|---|---|
| 2,339,981 | Cranmer et al. | Jan. 25, 1944 |
| 2,395,026 | Weaver | Feb. 19, 1946 |
| 2,509,811 | Dale | May 30, 1950 |
| 2,529,438 | Wennerbo | Nov. 7, 1950 |
| 2,577,648 | Dale | Dec. 4, 1951 |
| 2,676,805 | Tourtellot | Apr. 27, 1954 |

FOREIGN PATENTS

| | | |
|---|---|---|
| 573,419 | Great Britain | Nov. 20, 1945 |
| 590,563 | Great Britain | July 22, 1947 |
| 117,708 | Sweden | Nov. 26, 1946 |